April 13, 1954   B. KRALOWETZ   2,674,926
APPARATUS FOR CIRCUMFERENTIALLY MILLING LARGE
WORKPIECES, IN PARTICULAR STEEL INGOTS
Filed Jan. 26, 1950   2 Sheets-Sheet 1
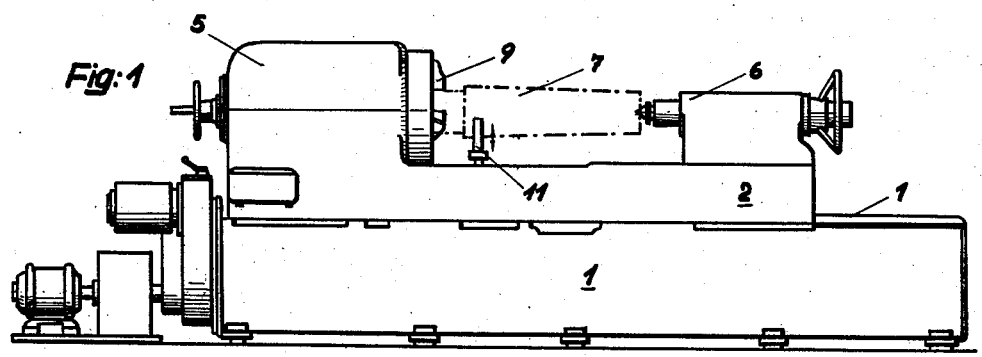
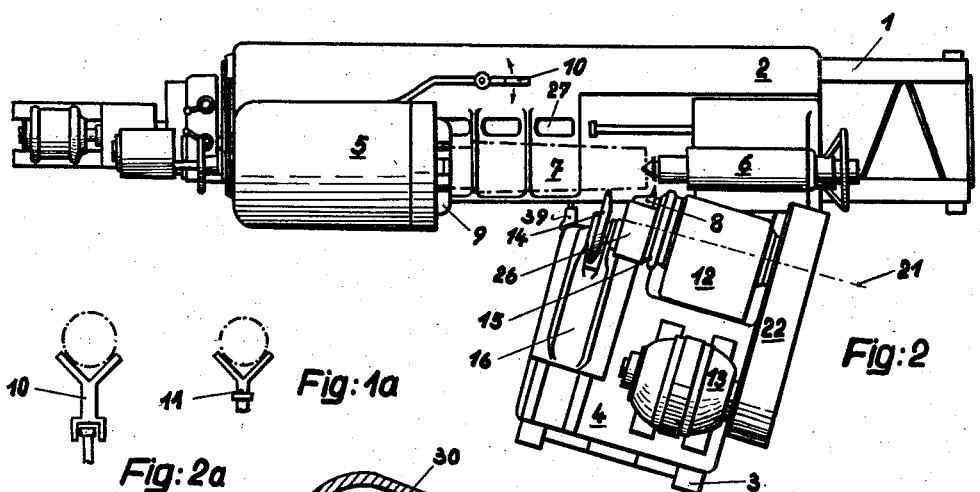
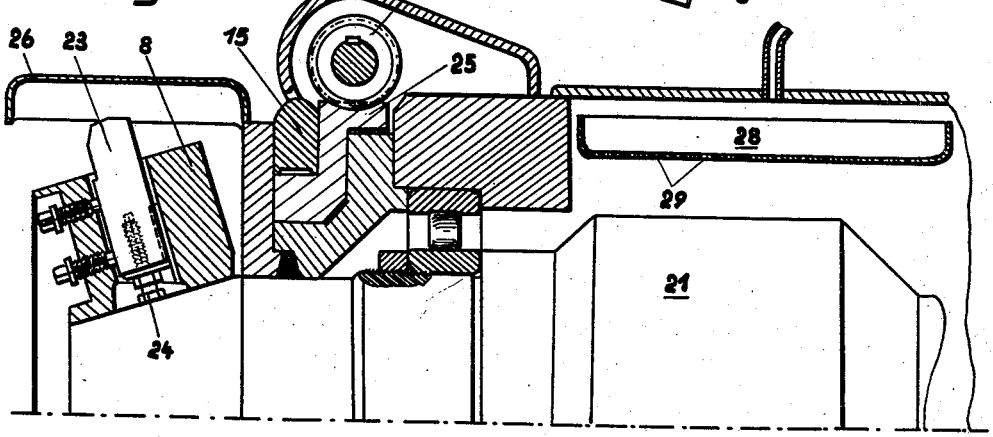
INVENTOR:
BRUNO KRALOWETZ
BY K. H. Mayr
ATTORNEY

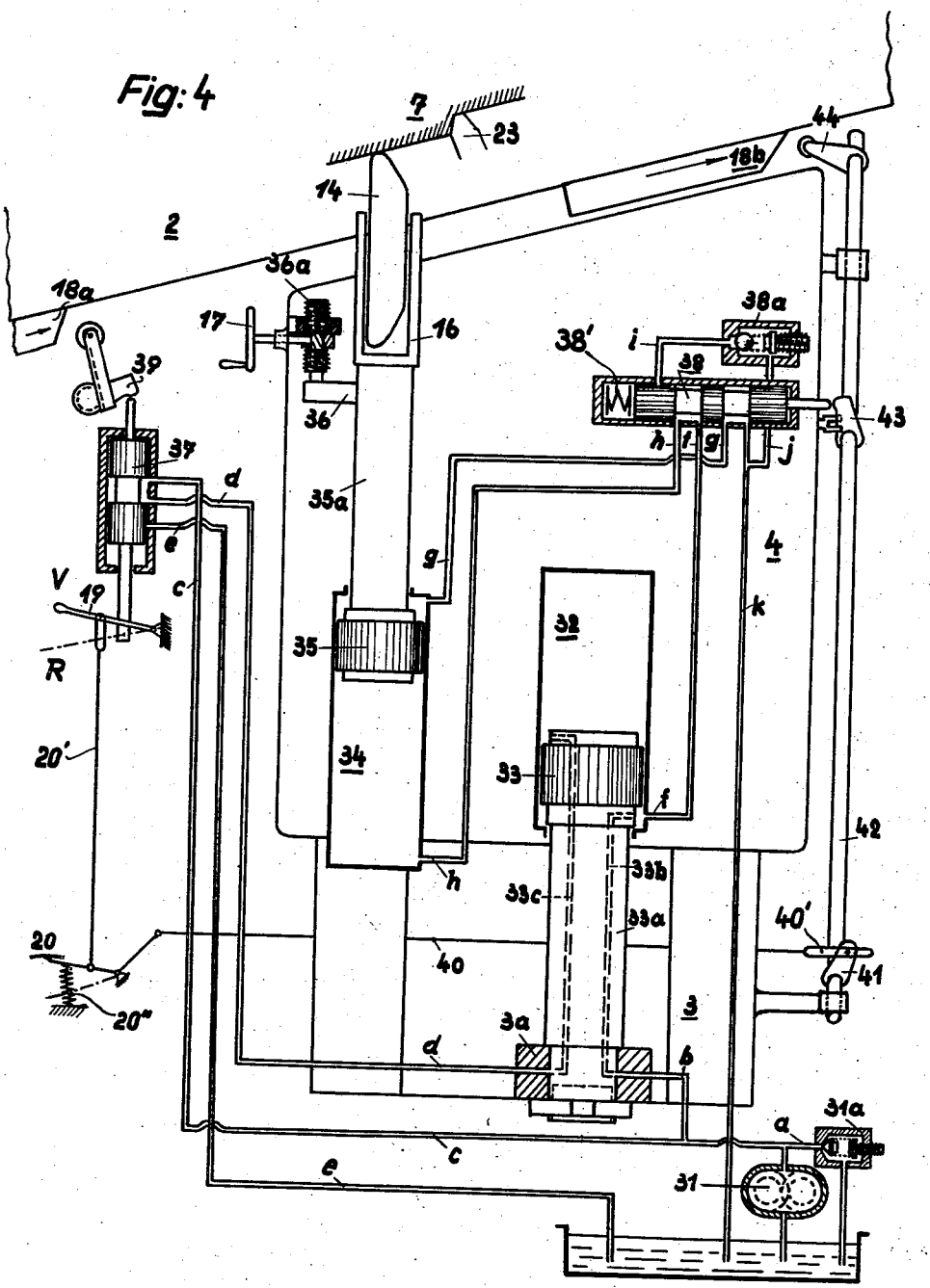

Patented Apr. 13, 1954

2,674,926

UNITED STATES PATENT OFFICE 2,674,926

APPARATUS FOR CIRCUMFERENTIALLY MILLING LARGE WORKPIECES, IN PARTICULAR STEEL INGOTS

Bruno Kralowetz, Steyr, Austria, assignor to August Saxer, Thalwil, Switzerland

Application January 26, 1950, Serial No. 140,724

Claims priority, application Austria January 31, 1949

6 Claims. (Cl. 90—15)

The invention relates to a machine for circumferentially milling large work pieces, in particular steel ingots.

An object of the invention is the provision of an uncomplicated milling machine permitting the use of high speed cutters.

The machine according to the invention comprises a conventional slide movable on a longitudinal bed and carrying a head-stock and a tail-stock, between which the work piece is supported, and a tool carriage bed extending at an angle to the longitudinal axis of said first bed and supporting a second slide carrying a cutter unit comprising a motor and a head-stock for the cutter, the rotation axis of the cutter being disposed at an acute angle to the generatrix of the circumferential surface of the work, the arrangement being such as to effect a sliding-off of the cutter from the surface of the rotating and longitudinally advancing work piece when the machine is in operation. The acute-angle position of the cutter spindle is preferably obtained by arranging the tool carriage or transverse bed at an angle to the longitudinal bed, the rotation axis of the cutter spindle preferably being disposed at a right angle to the guideways of the transverse bed. The inclined position of the cutter spindle with respect to the work permits the use of a cutter head of small diameter, rotating at high speed and carrying a great number of teeth, as well as of heavy fly-masses, there being no space restrictions caused by the tail-stock or the work piece.

With the machine according to the invention, heavy steel work pieces can be machined at cutting speeds of 200 to 300 meters per minute at a feed speed of the work of 2 meters per minute. At this proportion of speed of the cutter and of the feed, the stresses caused by the milling operation are small and permit a light construction of the machine. The small diameter of the cutting tool necessitates only a small speed reduction between the motor and the tool spindle to produce the desired cutting speed, and the tool spindle may be driven by means of a wedge belt and gears may be omitted. The arrangement according to the invention permits the use of a large and strong tool spindle, as is desirable when cutting steel, and of a heavy fly-wheel. The individual cutter tooth separates only a small chip and is in engagement with the work only a short time, leaving a multiple of that time for cooling. When working light metals, a cutting speed of 5,000 meters per minute can be reached.

Movement of the slide supporting the cutter unit is controlled by the work piece by means of a feeler which is slidably supported on the cutter unit slide and pressed to an abutment on the latter by means of a force acting in the direction toward the work piece. This force is greater than the force urging the cutter unit slide onto the rotating and longitudinally advancing work piece.

A further object of the invention is the provision of a hydraulic control of the cutter unit slide in dependence on the surface configuration of the work piece and in the provision of specially constructed and arranged means for effecting the duplicating motion. The combination of a longitudinal bed for the slide supporting the work piece and a bed for the slide supporting the cutter unit connected at an angle with the first bed permits arrangement of a stationary control stand adjacent to the work piece and with good visibility of the point to be worked. This combination also facilitates control of the tool supporting slide directly by the work piece, whereby construction and drive of the machine are considerably simplified. The duplicating mechanism according to the invention assures homogeneous cutting depth over the whole circumferential surface of the work. With the system according to the invention, less chip material is removed and lost than with conventional pattern and pendulum controlled duplicating systems. The system according to the invention provides for disengagement of the work piece-controlled duplicating mechanism if desired and permits directing the movement of the cutter unit slide relative to the work piece in dependence on a pattern connected with the work supporting slide for producing cylindrical, conical, or other configurations of the work. The proposed hydraulic duplicating system cannot be applied in the same manner, for example, to block-lathes because the intensity of the cutting stresses is too great to permit direct copying from the block or work piece without a servomotor.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a side view of the apparatus according to the invention;

Fig. 2 is a top view of the apparatus shown in Fig. 1;

Figs. 1a and 2a are side views of details shown in Figs. 1 and 2, respectively;

Fig. 3 is a large scale section through a portion of the cutter-spindle-stock of the apparatus according to the invention;

Fig. 4 is a diagrammatic illustration of the hydraulic control of the movements of the cutter unit supporting slide and of the feeler slide.

Like parts are designated by like numerals in all figures of the drawings.

The high speed milling apparatus comprises a longitudinal bed 1 slidably supporting a first slide 2 and a second bed 3 connected at an angle with the first bed and slidably supporting a second slide 4 which carries the cutter unit. Work piece or block 7 connected to slide 2 between headstock 5 and tail-stock 6 is rotated and moves in the direction of its longitudinal axis along the rotating cutter 8. This arrangement is of particular advantage with respect to the supervision of the machine. The work piece can be seen during all phases of operation and all push-buttons and levers for the control of the apparatus are within easy reach of the operator. The cutter head 8 does not move laterally of the work but in a direction inclined to the rotation axis of the work for adjustment according to the diameter of the work and for producing non-circular or conical configurations of the block. One end of the work 7 is made fast in chuck 9 of the head-stock 5 and the other end rests on tail-stock 6 which is longitudinally movable on the block-slide 2. Accurate setting of the work piece is conveniently effected at the rear end of the machine by manipulation of a hand-wheel. The work piece which is placed by a crane between head-stock and tail-stock is centered by centering forks 10 and 11; fork 10 is swingably and fork 11 vertically slidably connected with the block-slide 2. Fork 11 serves for adjusting the elevation of the work piece until fork 10 indicates centered position in the horizontal plane. Thereupon chuck jaws 9 are tightened and fork 10 is swung out of engagement with the work piece and fork 11 lowered. The chips fall through apertures 27 in the block slide.

The work is rotated by rotation of the chuck in the head-stock and advanced by advancing the block-slide 2. Rotation and feed can be individually stopped by conventional clutch arrangements.

The cutter supporting slide slides in guideways on bed 3 which is disposed at an angle to the longitudinal bed 1. The cutter unit comprises a cutter spindle stock 12 for the rotary cutter 8, a driving motor 13, and duplicating rollers 14 and 15. Slide 4 is moved hydraulically and pressed to the work 7 during normal operation for abutment of the copying or duplicating rollers on the work. The hydraulic cylinders and pipe lines are disposed in the interior of the slide. The forward duplicating roller or feeler 14 is supported by a third slide 16 which is slidably supported by the cutter unit slide and is also moved hydraulically. The position of roller 14 relative to the cutter head 8 can be adjusted by manipulating hand-wheel 17 (Fig. 4) for determining the cutting depth. Movement of the cutter unit slide is controlled automatically by abutments 18a, 18b provided on the block-slide or by means of a hand lever 19 and pedal 20. The cutter unit slide can be withdrawn from the work at high speed at any time. The abutments effect withdrawal of the cutter slide after completion of the milling operation and also effect stopping of the drive of the block-slide.

Because of the high cutting speed which can be obtained with the apparatus according to the invention, only a one-stage transmission is needed between the motor and the cutter spindle 21. Liberally dimensioned wedge belts 22 are used for driving the heavy and stiff cutter spindle which carries the cutter head 8. The teeth 23 are so set in the head as to permit easy exchange. Each tooth is provided with an adjustable abutment screw 24 which is set after grinding of the tooth to provide the desired clearance. The teeth rest on the cutter head by way of screws 24. No other adjustment is needed when setting a tooth into the cutter head.

The cutter spindle 21 carries a second duplicating roller or tracer 15 which begins to act when the forward roller leaves the work at the forward end of the latter. The trailing roller 15 rotates on an eccentric 25 and its position with respect to the cutter can be changed by rotating the eccentric (Fig. 3). The whole cutter head is covered by a hood 26.

The bed for the slide for the cutter unit contains the oil reservoir for the hydraulic mechanism and the members for hand control of the cutter slide. A pump for the hydraulic system and a lubricating apparatus are attached to the sides of bed 3. Since it is unavoidable that a portion of the heat developed during cutting passes through the tool into spindle 21, the latter is cooled by oil which enters through the top of the cutter unit and is distributed through apertures 29 in the bottom of a tray 28 onto the spindle. The heated oil flows from the spindle down into the oil reservoir where it may be cooled.

As it would not be economical to use a rigid template for steering the cutter slide, the ingot itself is used as template. The feeler roller 14 which has about the same diameter as the cutter head and is borne as close as possible to the plane of the tool and is movable in a direction toward the work, is used for stemming the whole cutter slide against the work piece, the slide being pressed to the work by hydraulic pressure. Movement of the cutter thus corresponds to the surface configuration of the work. The cutter is closer to the rotation axis of work than the roller 14, the difference being equal to the cutting depth. As the milling operation, which began at the thinner end of the ingot, proceeds, roller 14 becomes disengaged from the work and roller 15, which is mounted on the cutter spindle, takes over. Roller 15 trails the cutter and rests against the worked portion of the ingot and must be placed at the same distance from the rotation axis of the block as the tool. For milling locally limited portions of the ingot, rotation thereof is interrupted and it is necessary that the tool can work into the block; for this purpose, the position of the trailing roller must be changeable relative to the tool. Roller 15 is therefore borne by an eccentric 25 or a slide, and its position is changed by manipulation of a worm 30.

By using the ingot itself as a template, any block which can be milled at all by circumferential milling can be trimmed without special controls, and exact centering of the block, which takes time, is also unnecessary. Aside from completely skimming an ingot, the machine according to the invention can produce longitudinal grooves, circumferential grooves and cavities, by using the two copying rollers.

Referring more particularly to Fig. 4 of the drawings rod 33a of a first piston 33 is borne in bearing portion 3a of the stationary cutter slide bed 3. Rod 33a has two bores 33b and 33c for conducting oil into a first cylinder 32 which is mounted on the movable cutter slide 4 and constitutes, together with piston 33, a first power means. This arrangement avoids movable oil conduits.

Slide 4 carries other power means comprising a second cylinder 34 for a second piston 35, to rod 35a of which is fixed a slide 16 which is movable on slide 4 and rotatably supports the forward roller or feeler 14. Movement of slide 16 toward the work is limited by abutment of a protuberance 36 with a stop 36a which is movably supported on slide 4 and whose position can be adjusted by manipulation of wheel 17 with which it is connected by a worm gear. Slide 4 also supports a reversing means 38 for controlling the oil in cylinder 34 and the slide 16.

An oil pump 31 and an adjustable spring-loaded relief valve 31a are located in bed 3, valve 31a serving to maintain a desired maximum pressure in the hydraulic system. Bed 3 also supports a reversing means 37 for controlling the oil in cylinder 32 and the movement of the cutter slide 4. The reversing means can be operated by hand by moving a lever 19, forming second operating means, in the same direction as the desired movement of slide 4; it can also be actuated automatically by stop 18a fixed on the block-slide and adapted to abut second actuating means comprising a cam mechanism 39 which is operatively connected with a second valve 37.

A pedal 20 forming first operating means is connected with hand lever 19 by a rod 20' for oscillating control shaft 42, to an arm 41 of which the pedal is connected by rod 40. A cam 43 forming first actuating means is longitudinally slidably mounted on shaft 42 for actuating the first reversing valve 38 in slide 4. Cam 43 is taken along by the moving slide 4. Shaft 42 is also oscillated automatically by engagement of stop 18b mounted on the block-slide and an arm 44 fixed on shaft 42.

When the apparatus is at rest, hand lever 19 is in the position indicated by "R" and a dash-dot line. The upper end of rod 20' has a slot forming a lost-motion means in which lever 19 can be moved to position "R" without acting on the pedal 20.

Pump 31 forces oil through discharge conduit a and a first conduit b into the piston rod side of cylinder 32. The other closed side of the cylinder is connected with the oil reservoir by means of a seventh conduit d, reversing valve 37, and sixth conduit e, and is without pressure. Cylinder 32 and slide 4 on which the cylinder is mounted is therefore forced rearward and away from the work 7. At the same time, the closed side of cylinder 34 is filled with pressure oil through second conduit f, valve 38, and third conduit h, whereas the piston rod side of cylinder 34 is connected with the oil reservoir by way of a fourth conduit g, valve 38, and conduit k. Piston 35 and feeler 14 connected thereto are therefore moved forward toward the work 7 until protuberance 36 abuts stop 36a.

Hand lever 19 is moved to the position shown in solid lines in Fig. 4 designated by "V" for normal operation of the apparatus. In this position of lever 19, a fifth conduit c, which is under normal pump pressure and was closed when lever 19 was in position "R," is connected with conduit d whereby the same pressure prevails on both sides of piston 33. Due to the difference of the size of the surfaces of piston 33, one surface being smaller than the other by the cross-section of rod 33a, cylinder 32 and cutter slide 4 connected therewith are moved forward, upward in Fig. 4, and toward the work until roller 14 makes contact with the work. Since the effective cross-section of piston 35 is larger than the cross-section of piston rod 33a which is the surface effecting forward movement of cylinder 32, the force pressing on piston 35 is greater than the force moving slide 4 toward the work and the oil in cylinder 34 acts like a rigid body.

Roller 14 can be moved relative to slide 4 by manipulation of hand-wheel 17 for adjusting the cutting depth during normal operation of the machine. If, due to circumferential irregularities of the work, roller 14 is pressed rearward (down in Fig. 4) its movement is transferred through rod 35a, piston 35, and the oil in cylinder 34 to slide 4, whereby oil is forced out of cylinder 32 and through conduit d, control valve 37, conduit c, and out through relief valve 31a. The force pressing cylinder 32 and slide 4 toward the work is not changed by the aforedescribed process and roller 14 continues to follow all irregularities in the surface of the work, as if slide 4 were pressed toward the work by a spring. Slide 4 can be withdrawn from the work at any time by turning lever 19 to position "R."

The second copying roller or tracer 15 engages the work before the first roller, 14, leaves it and is withdrawn from the work. This is effected by the stop 18b on the slide supporting the work, which slide presses on arm 44, turning shaft 42. Arm 43 thereby presses valve 38 to the left as seen in Fig. 4, and the closed side of cylinder 34 is connected through conduit h with conduit i and through relief valve 38a and conduit j and k with the oil reservoir. Conduit g, which was previously connected with conduit k and without pressure, is now connected with the pressure conduit f, whereby the piston rod side of cylinder 34 receives oil under pressure and roller slide 16 is withdrawn from the work. This takes place during normal operation of the machine, and flow of oil from the closed side of cylinder 34 is retarded by the spring-loaded and adjustable valve 38a which prevents an undesired lowering of the pressure in the system, particularly in cylinder 32, and the force with which the rotary cutter is pressed to the work remains the same.

The cutter slide 4 is automatically withdrawn from the work as soon as the milling operation is completed, i. e. when the cutter arrives at chuck 9. This is effected by abutment of stop 18a, which is mounted on the block-slide, on elbow lever 39, whereby reversing valve 37 is moved into the position where lever 19 is in position "R" and slide 4 is withdrawn with the rotary cutter from the work.

In order to avoid damage to the cutter, slide 4 must not be permitted, at the start of the milling operation, to be moved toward the work without the copying roller being in advanced position. For this purpose, pedal 20 is retained in the position shown in solid lines in Fig. 4 by means of a spring 20''. Whenever roller 14 must be withdrawn, pedal 20 is depressed against the action of spring 20" and rod 42 is turned by way of rod 40 and arm 41. Arm 43 presses the reversing valve 38 against the action of spring 38' and roller 14 is withdrawn as explained previously. At the same time, lever 19 is pulled by rod 20' into position "R," and slide 4 with the cutter is removed from the work. The mechanism 40 to 43 is so constructed that lever 19 reaches position "R" before arm 43 actuates valve 38. When pedal 20 is released, valve 38 returns to the position shown in Fig. 4, causing roller slide 16 to advance to its extreme forward position which is determined by abutment of 36 on 36a. Due to the one-way effective connection between the pedal 20 and the lever 19, the latter remains in position "R" and slide 4 in its rear position, until lever 19 is moved to position "V." To assure movement of lever 19 to position "R" prior to actuation of shaft 42 and of valve 38, the right end of rod 40 is provided with a slot 40' forming a lost-motion means accommodating a pin on arm 41.

I claim:

1. An apparatus for circumferential milling of large pieces of work, comprising, in combination, a cutter unit including a motor, a cutter spindle driven by said motor, and a cutter mounted on said spindle; a longitudinal bed; a first slide longitudinally movably supported by said bed and supporting a head stock and a tailstock for rotatably supporting the work therebetween; a second bed disposed at an oblique angle to said longitudinal bed in a fixed position relative thereto; a second slide carrying said unit and being movable on said second bed in a direction substantially at a right angle to the rotation axis of said spindle, said spindle being disposed at an acute angle to the generatrix of the circumferential surface of the work; a third slide mounted on said second slide and movable thereon toward and from the work; a feeler means adapted to engage the work and positively connected to said third slide; a stop mounted on said second slide and adapted to limit movement of said third slide toward the work; first power means connected with said second bed and with said second slide for moving and pressing the latter toward the work; other power means connected with said second slide and said third slide for moving said third slide relative to said second slide and toward the work, said power means being so constructed that the pressure produced by said first power means for pressing said second slide toward the work is smaller than the pressure produced by said other power means for pressing said third slide toward the work, affording movement of said second slide by the third slide from the work when the radius of the surface portion of the work engaged by said feeler increases, each of said power means being operable to return the second and third slides, respectively, from the work; a reversing means operatively connected with each of said power means and operable to reverse the same; and an actuating means engaging and adapted to operate each of said reversing means and movable into the path of said first slide, said first slide being adapted to engage each of said actuating means when the latter has thus been moved into its path and to operate the same to reverse the respective power means through the intermediary of the respective reversing means.

2. An apparatus for circumferential milling of large pieces of work, comprising, in combination, a cutter unit including a motor, a cutter spindle driven by said motor, and a cutter mounted on said spindle; a longitudinal bed; a first slide longitudinally movably supported by said bed and supporting a head stock and a tail stock for rotatably supporting the work therebetween; a second bed disposed at an oblique angle to said longitudinal bed in a fixed position relative thereto; a second slide carrying said unit and being movable on said second bed in a direction substantially at a right angle to the rotation axis of said spindle, said spindle being disposed at an acute angle to the generatrix of the circumferential surface of the work; a third slide mounted on said second slide and movable thereon toward and from the work; a feeler means adapted to engage the work and positively connected to said third slide; a stop mounted on said third slide and adapted to limit movement of said third slide toward the work; first power means connected with said second bed and with said second slide for moving and pressing the latter toward the work; other power means connected with said second slide and said third slide for moving said third slide relative to said second slide and toward the work, said power means being so constructed that the pressure produced by said first power means for pressing said second slide toward the work is smaller than the pressure produced by said other power means for pressing said third slide toward the work, affording movement of said second slide by the third slide from the work when the radius of the surface portion of the work engaged by said feeler increases, said first power means being operable to return said second slide from the work; a reversing means operatively connected with said first power means and operable to reverse the same; an actuating means engaging and adapted to operate said reversing means and movable into the path of said first slide, said first slide being adapted to engage said actuating means when the latter has thus been moved into its path and to operate the same to reverse the said first power means through the intermediary of said reversing means; operating means associated with said reversing means; and lost-motion means connecting said operating means with said actuating means.

3. An apparatus for circumferential milling of large pieces of work, comprising, in combination, a cutter unit including a motor, a cutter spindle driven by said motor, and a cutter mounted on said spindle; a longitudinal bed; a first slide longitudinally movably supported by said bed and supporting a head stock and a tail stock for rotatably supporting the work therebetween; a second bed disposed at an oblique angle to said longitudinal bed in a fixed position relative thereto; a second slide carrying said unit and being movable on said second bed in a direction substantially at a right angle to the rotation axis of said spindle, said spindle being disposed at an acute angle to the generatrix of the circumferential surface of the work; a third slide mounted on said second slide and being movable thereon toward and from the work; a feeler means adapted to engage the work and connected with said third slide; a first hydraulic cylinder connected with said second slide; a first piston in said cylinder; a piston rod extending from said first piston outside of said first cylinder and being rigidly connected with said second bed; a second hydraulic cylinder connected with said second slide; a second piston in said second cylinder; a piston rod extending from said second piston outside of said second cylinder and connected with said third slide; a source of pressure fluid; a first conduit connecting the space in said first cylinder through which the rod of said first piston extends with said source; a first control valve; a second conduit connecting the space in said second cylinder, with which said first conduit is connected, with said first valve; a third conduit connecting said valve with the space in the second cylinder on the side of the second piston distal with respect to its piston rod; a fourth conduit connecting said valve with the space in the second cylinder through which the rod of the second piston extends; said first valve connecting said second conduit either with said third or with said fourth conduit; a second control valve; a fifth conduit connected with said source and terminating in said second valve; a sixth conduit connected with said second valve for relieving pressure fluid therefrom; a seventh conduit connecting said second valve with the space in said first cylinder on the side of the first piston distal with respect to its piston rod; said second valve connecting said seventh conduit either with said fifth or said sixth conduit; an oil reservoir; a relief valve connected between said first valve and said oil reservoir; and means operable to move said first valve into a position in which it connects said second conduit with said fourth conduit, and said third conduit through said relief valve with said oil reservoir.

4. An apparatus for circumferential milling of large pieces of work, comprising, in combination, a cutter unit including a motor, a cutter spindle driven by said motor, and a cutter mounted on said spindle; a longitudinal bed; a first slide longitudinally movably supported by said bed and supporting a head stock and a tail stock for rotatably supporting the work therebetween; a second bed disposed at an oblique angle to said longitudinal bed; a second slide carrying said unit and being movable on said second bed in a direction substantially at a right angle to the rotation axis of said spindle, said spindle being disposed at an acute angle to the generatrix of the circumferential surface of the work; a third slide mounted on said second slide and movable thereon toward and from the work; a feeler means adapted to engage the work and connected with said third slide; a stop mounted on said second slide and adapted to limit movement of said third slide toward the work; first power means connected with said second bed and with said second slide for moving and pressing the latter toward the work; other power means connected with said second slide and said third slide for moving and pressing said third slide relative to said second slide and toward the work, said power means being so constructed that the pressure produced by said first power means for pressing said second slide toward the work is smaller than the pressure produced by said other power means for pressing said third slide toward the work, affording movement of said second slide by the third slide from the work when the radius of the surface portion of the work engaged by said feeler increases; a trailing duplicating roller eccentrically supported by said cutter spindle and adapted to engage the work after the cutter for maintaining relative position of the work and the second slide after said feeler means has passed one end of the work; and means for changing the relative angular position of said roller and said rotation axis of the cutter spindle.

5. An apparatus for circumferential milling of large pieces of work, comprising, in combination, a cutter unit including a motor, a cutter spindle driven by said motor, and a cutter mounted on said spindle; a longitudinal bed; a first slide longitudinally movably supported by said bed and supporting a head stock and a tail stock for rotatably supporting the work therebetween; a second bed disposed at an oblique angle to said longitudinal bed; a second slide carrying said unit and being movable on said second bed in a direction substantially at a right angle to the rotation axis of said spindle, said spindle being disposed at an acute angle to the generatrix of the circumferential surface of the work; a third slide mounted on said second slide and being movable thereon toward and from the work; a feeler means adapted to engage the work and connected with said third slide; a first hydraulic cylinder connected with said second slide; a first piston in said cylinder; a piston rod extending from said first piston outside of said first cylinder and being rigidly connected with said second bed; a second hydraulic cylinder connected with said second slide; a second piston in said second cylinder; a piston rod extending from said second piston outside of said second cylinder and connected with said third slide; a source of pressure fluid; a first conduit connecting the space in the first cylinder through which the rod of said first piston extends with said source; a first control valve; a second conduit connecting the space in said first cylinder, with which said first conduit is connected, with said first valve; a third conduit connecting said valve with the space in the second cylinder on the side of the piston distal with respect to its piston rod; a fourth conduit connecting said valve with the space in the second cylinder through which the rod of the second piston extends; said first valve connecting said second conduit either with said third or with said fourth conduit; a second control valve; a fifth conduit connected with said source and terminating in said second valve; a sixth conduit connected with said second valve for relieving pressure fluid therefrom; a seventh conduit connecting said second valve with the space in said first cylinder on the side of the first piston distal with respect to its piston rod; said second valve connecting said seventh conduit either with said fifth or said sixth conduit; said first valve comprising a spring yieldingly holding said valve in a position for connecting said second and third conduits; first actuating means responsive to a predetermined position of said first slide and connected with said first valve for moving it against the action of said spring to a position for connecting said second conduit with said fourth conduit; and first operating means connected with said actuating means for actuation thereof by an operator.

6. An apparatus as defined in claim 5, comprising second operating means connected with said second valve for operation thereof by an operator, second actuating means responsive to a predetermined position of said first slide and adapted to move said second valve from a position connecting said seventh conduit with said fifth conduit to a position connecting said seventh conduit with said sixth conduit; means connecting said first and said second operating means and comprising lost motion means affording operation of said second operating means upon actuation of said first operating means and said second valve in the same manner as it can be moved by said second actuating means and not vice versa; said first operating means comprising lost motion means affording operation of said first actuating means by said first operating means only after movement of said second operating means and valve connected therewith has been initiated.

References Cited in the file of this patent

UNITED STATES PATENTS

| Number | Name | Date |
|---|---|---|
| 1,896,052 | Ferris | Jan. 31, 1933 |
| 1,976,459 | Quichon | Oct. 9, 1934 |
| 2,016,931 | Richard | Oct. 8, 1935 |
| 2,025,748 | Howe | Dec. 31, 1935 |
| 2,068,890 | Sassen | Jan. 26, 1937 |
| 2,208,572 | Drummond | July 23, 1940 |